(12) United States Patent
Harvill et al.

(10) Patent No.: US 10,740,694 B2
(45) Date of Patent: Aug. 11, 2020

(54) SYSTEM AND METHOD FOR CAPTURE AND ADAPTIVE DATA GENERATION FOR TRAINING FOR MACHINE VISION

(71) Applicant: VIS MACHINA, INC., Albany, CA (US)

(72) Inventors: Alex Harvill, Berkeley, CA (US); Michael Fu, Albany, CA (US)

(73) Assignee: Vis Machina Inc., Albany, CA (US)

( * ) Notice: Subject to any disclaimer, the term of this patent is extended or adjusted under 35 U.S.C. 154(b) by 0 days.

(21) Appl. No.: 16/534,763

(22) Filed: Aug. 7, 2019

(65) Prior Publication Data

US 2020/0050965 A1 Feb. 13, 2020

Related U.S. Application Data

(60) Provisional application No. 62/717,513, filed on Aug. 10, 2018.

(51) Int. Cl.
*G06N 20/00* (2019.01)
*G06N 5/04* (2006.01)

(52) U.S. Cl.
CPC ............ *G06N 20/00* (2019.01); *G06N 5/04* (2013.01)

(58) Field of Classification Search
CPC .................................. G06N 20/00; G06N 5/04
See application file for complete search history.

(56) References Cited

U.S. PATENT DOCUMENTS

2003/0031357 A1 2/2003 Wenzel et al.
2013/0142421 A1 6/2013 Silver et al.
(Continued)

OTHER PUBLICATIONS

International Searching Authority, "Search Report" in application No. PCT/US19/45893, dated Oct. 31, 2019, 16 pages.

(Continued)

*Primary Examiner* — Miranda M Huang
*Assistant Examiner* — Kevin W Figueroa
(74) *Attorney, Agent, or Firm* — Hickman Palermo Becker Bingham LLP

(57) ABSTRACT

A computer-implemented method of performing machine vision prediction of digital images using synthetically generated training assets comprises digitally capturing a plurality of assets; configuring each of the assets in the plurality of assets with a plurality of asset attributes; under computer program control, selecting a plurality of different combinations of parameters from among the plurality of asset attributes, and creating a plurality of sets of different synthetic dataset parameters; using computer graphics software, and example parameter values from among the synthetic dataset parameters, creating a synthetic dataset by compiling from a plurality of example images and metadata; configuring a plurality of machine learning trials and executing the trials to train a machine vision model, resulting in creating and storing a trained machine vision model; executing a validation of the trained machine vision model; and inferring a prediction using the trained machine vision model. Trained models are scored against success criteria and re-trained using pseudo-random sampling of different parameters clustered around failure points. As a result, machine vision models may be trained with high accuracy using large datasets of synthesized digital images that are richly parameterized, rather than human captured digital images.

18 Claims, 6 Drawing Sheets

(56) References Cited

U.S. PATENT DOCUMENTS

2014/0267243 A1* 9/2014 Venkataraman ........ G06T 7/557
                                                    345/419
2017/0169620 A1* 6/2017 Bleiweiss ............... G06F 17/50
2017/0243083 A1  8/2017 Wang et al.
2018/0158210 A1  6/2018 Estrada et al.
2019/0080347 A1* 3/2019 Smith ................ G06Q 30/0244

OTHER PUBLICATIONS

Current Claims in application No. PCT/US 19/45893, dated Oct. 2019, 6 pages.

* cited by examiner

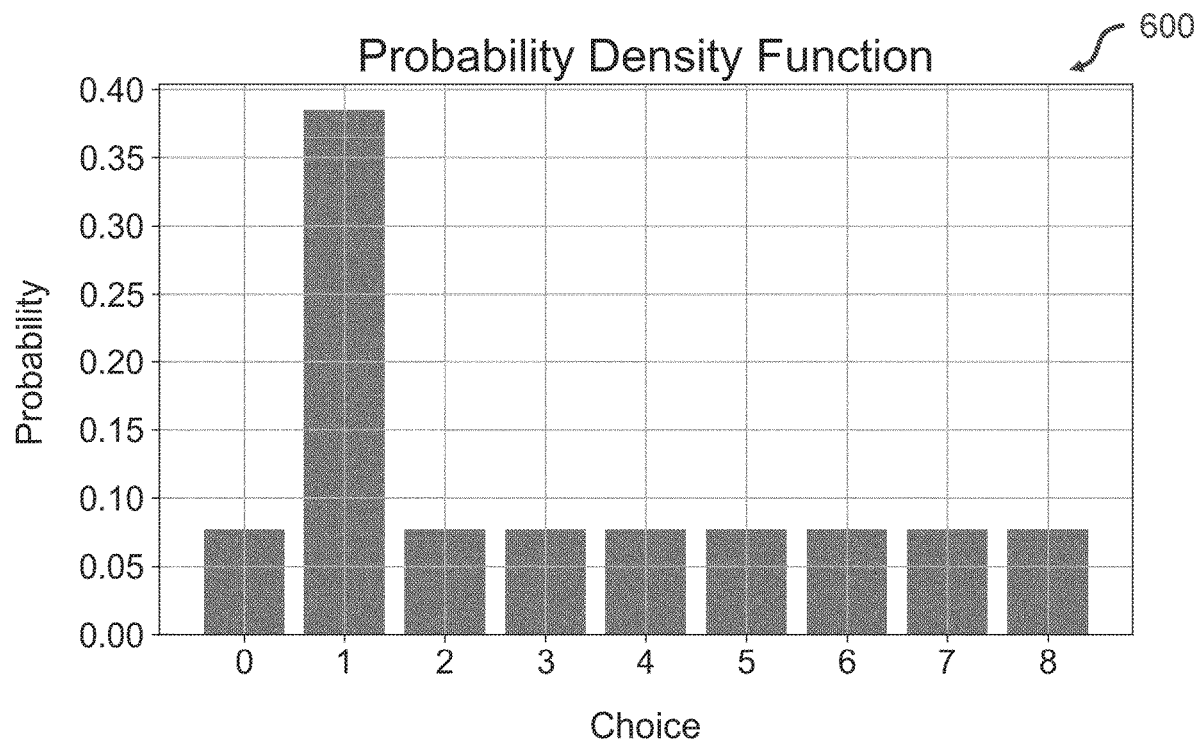
FIG. 6
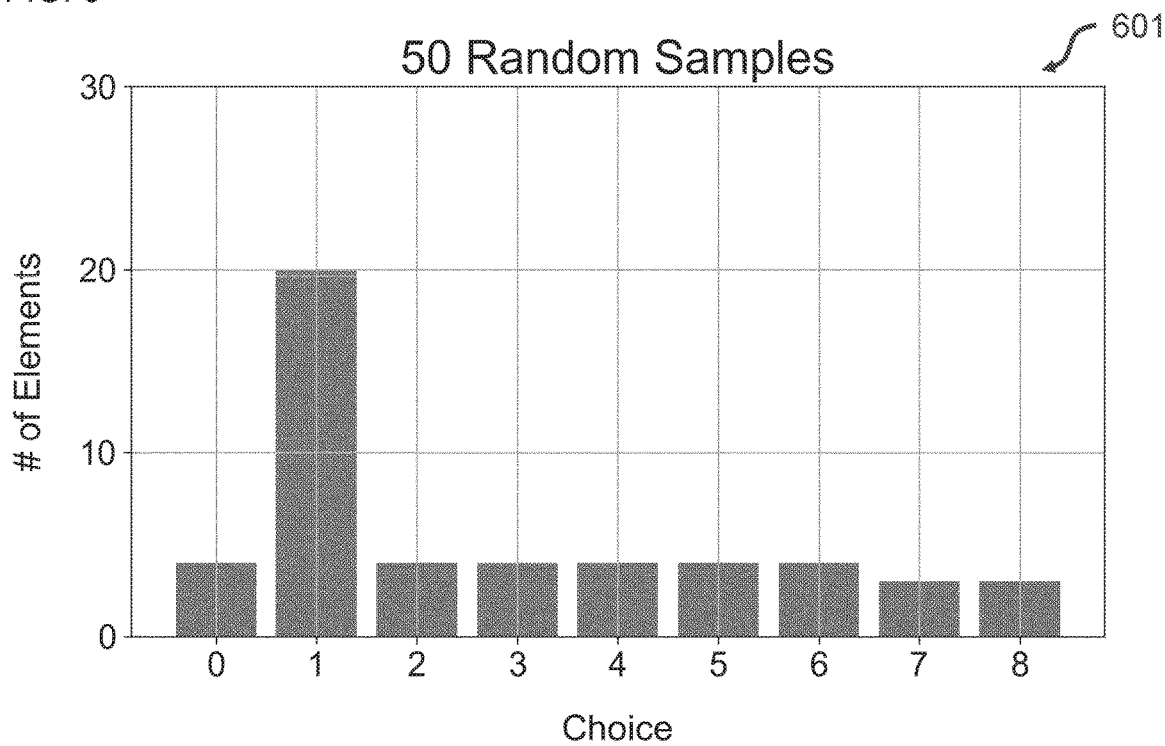

SYSTEM AND METHOD FOR CAPTURE AND ADAPTIVE DATA GENERATION FOR TRAINING FOR MACHINE VISION

BENEFIT CLAIM

This application claims the benefit under 35 U.S.C. § 119(e) of provisional application 62/717,513, filed Aug. 10, 2018, the entire contents of which are hereby incorporated by reference for all purposes as if fully set forth herein.

COPYRIGHT NOTICE

A portion of the disclosure contains copyrightable works of authorship. The copyright owner has no objection to reproduction of this document in the form that it appears in USPTO records, and otherwise reserves all copyright whatsoever. Copyright © 2018-2019 Vis Machina, Inc.

FIELD OF THE DISCLOSURE

One technical field of the present disclosure is machine vision and the training of such systems. Another technical field is the capture, collection, organization, and adaptive generation of data used for training machine vision systems.

BACKGROUND

Advancements in deep learning have resulted in significant progress in the field of machine vision. One common challenge in training deep learning networks is the amount of quality training data that is required to train a model. The successful training of a machine vision system is dependent on having sufficient data. Most current methods for gathering training data require capture of real-world images with manual annotation of the visual data.

An alternative to the manual method for training machine vision system is to use computer-generated data, also known as synthetic data. Computer algorithms can be used to simulate real-world images and generate accurate annotations of the visual data. This reduces the dependence on manual methods of data collection and allows for scalable generation of training data. Synthetic data can be used alone or used in conjunction with real-world data to train machine vision systems. In addition, the collection of data is not a straightforward task. There are many challenges in determining what data to collect in terms of subject, quality, and distribution of the collected images. Acquiring appropriate data entails gathering or identifying the data that correlates with the desired outcomes.

SUMMARY

The appended claims may serve as a summary of the disclosure.

BRIEF DESCRIPTION OF DRAWINGS

A detailed description is set forth below with reference to the accompanying drawing figures. In the figures, the leftmost digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 is a diagram that illustrates an example of single choice sampling with a probability distribution function with which an embodiment may be implemented.

DETAILED DESCRIPTION

Figure 1:
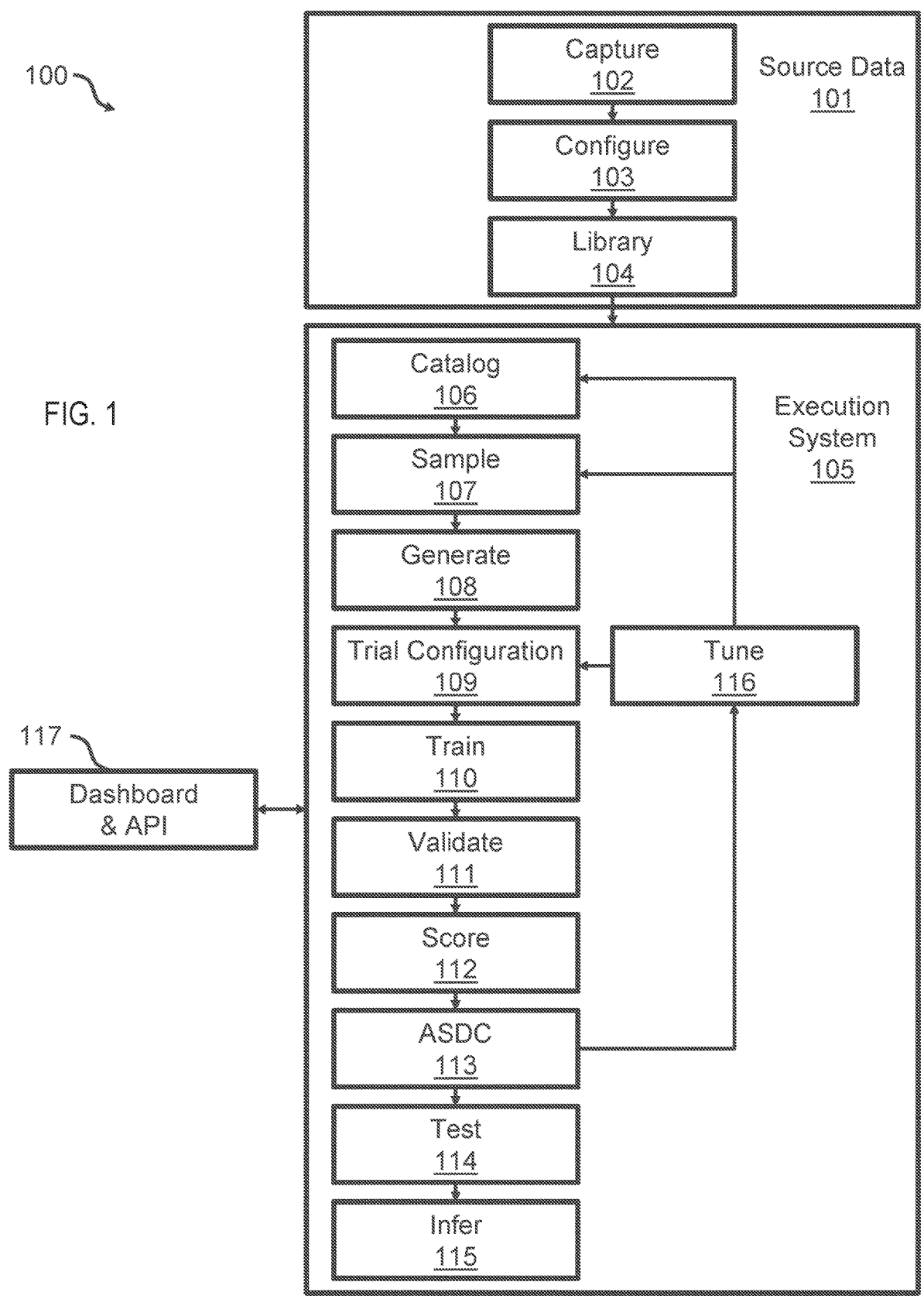
FIG. 1 is a block diagram of a system for capture and adaptive data generation for training machine vision in accordance with one or more embodiments.

Embodiments are described in separate sections below according to the following outline:
 1. General Overview
 2. Description of Example Embodiments
 3. Implementation Example—Hardware Overview
 4. Benefits, Extensions and Alternatives

1. General Overview

In various embodiments, a computer system and method are disclosed for the capture, adaptive data generation and training for machine learning models in the field of machine vision. In an embodiment, computer graphics software is programmed to generate image data to serve as synthetic training data for the training of machine learning models. The synthetically generated data contains annotations to provide ground-truth information along with visual image information. Depending on the need, the synthetic dataset can be used as a substitute or in conjunction with real-world datasets in the training of machine learning models.

Generating data using computer graphics typically requires digital assets and extensive configuration. In an embodiment, a digital asset can be created through the capture of real-world objects or imported into the system if the asset already exists digitally. These digital assets are configured and combined to produce desired dataset variation. The digital assets are managed and stored in a library as further described herein and organized with a library catalog as further described.

Use of computer graphics in embodiments allows the on-demand creation of a dataset with user configurable size and characteristics. A sampling methodology is used to determine what synthetic data is generated for training. The weakness of a dataset in the context of a specific machine learning model is quantified as a score. This score may be summarized and reported to allow defect analysis of the computer vision system. New datasets are configured adaptively using the score information from previous dataset testing. The machine learning model is trained with the new dataset and scored again, repeating the process until desired results are achieved or detected.

In an embodiment the resulting trained model is optimized and packaged for production and deployed for use.

Thus, some embodiments provide a computer-implemented method of performing machine vision prediction of digital images using synthetically generated training assets comprises digitally capturing a plurality of assets; configuring each of the assets in the plurality of assets with a plurality of asset attributes; under computer program control, selecting a plurality of different combinations of parameters from among the plurality of asset attributes, and creating a plurality of sets of different synthetic dataset parameters; using computer graphics software, and example parameter values from among the synthetic dataset parameters, creating a synthetic dataset[MF1] by compiling from a plurality of example images and metadata; configuring a plurality of machine learning trials and executing the trials to train a machine vision model, resulting in creating and storing a trained machine vision model; executing a validation of the trained machine vision model; and inferring a prediction using the trained machine vision model. Trained models are scored against success criteria and re-trained using pseudo-random sampling of different parameters clustered around failure points. As a result, machine vision models may be trained with high accuracy using large datasets of synthesized digital images that are richly parameterized, rather than human captured digital images.

In one embodiment, a computer-implemented method of performing machine vision prediction of digital images using synthetically generated training assets is provided, the method implemented using a first set of executable computer program instructions, the method comprising digitally capturing a plurality of assets, each of the assets comprising a one or more[MF2] digital data files; configuring each of the assets in the plurality of assets with a plurality of asset attributes; under computer program control, selecting a plurality of different combinations of parameters from among the plurality of asset attributes, and creating a plurality of sets of different synthetic dataset parameters; using computer graphics software that is different than the first set of executable computer program instructions, and example parameter values from among the synthetic dataset parameters, creating a synthetic dataset by compiling from a plurality of example images and metadata; configuring a plurality of machine learning trials and executing the trials to train a machine vision model, resulting in creating and storing a trained machine vision model; executing a validation of the trained machine vision model; inferring a prediction using the trained machine vision model.

In another embodiment, a computer-implemented method of performing machine vision prediction of digital images using synthetically generated training assets is provided, the method implemented using a first set of executable computer program instructions, the method comprising digitally capturing a plurality of assets, each of the assets comprising a one or more digital data files; parameterizing each of the assets, to create parameterized assets, by an asset state comprising a first scale, a first plurality of material properties, a first deformation, a first mesh parameterization, and first camera points of interests; parameterizing each scene among the assets by a first list of the assets and a second list of cameras for scene attributes of a second scale, a second plurality of material properties, a second deformation, a second mesh parameterization, and second camera points of interests; selecting a dataset target from among training, validating and testing, resulting in a selected dataset target; tagging each scene for the selected dataset target; configuring an environment map for the selected dataset target; configuring annotation output states to provide annotations for different outputs; configuring output images comprising one or more masks selected from among object identifiers and segmentation, depth, color, or custom masks; configuring output metadata comprising, positions and alignment, labels, hierarchy; configuring quality settings for output comprising render samples per pixel and resolution; each of the foregoing comprising minimum and maximum values and collectively comprising a parameter space of the assets; using a plurality of different parameterized assets from among all the parameterized assets, configuring a plurality of machine learning trials and executing the trials to train a machine vision model, resulting in creating and storing a trained machine vision model; scoring the trained machine vision model to compute performance of the different parameterized assets, resulting in a composite score value for comparison against a set of success criteria and a set of points of failure; clustering one or more new data points around the points of failure to resample the parametric space using any one of: single choice sampling, sequential choice sampling, local cluster sampling, and local spatial sampling [MF3] with a probability distribution function; and repeating the configuring the plurality of machine learning trials, executing the trials, scoring the trained machine vision model and the clustering until the composite score value satisfies the success criteria. Other embodiments may use other sampling strategies, as further described in other sections.

2. Description of Example Embodiments

FIG. 1 is a block diagram that illustrates one embodiment of a system 100 for capture, adaptive data generation and training for machine learning models for machine vision.

In an embodiment, system 100 may include but is not limited to a source data sub-system 101 to handle the sources of data, an execution system 105 to produce results, and a dashboard and API 117 to provide an interface to the system. In an embodiment, source data 101 sub-system may be comprised of but is not limited to components for the capture of assets, to configure assets, and to assemble a library of assets as indicated by blocks 102, 103, and 104. In an embodiment, execution sub system 105 may be comprised of but is not limited to components for a catalog 106 of assets, to sample 107 assets from the catalog, to generate 108 synthetic data, for trial configuration 109 of a training run, to train 110 the machine vision model, to validate 111 the trained model, to score 112 the trained model, for adaptive synthetic data control 113 of data generation and training, to test 114 the trained model, to infer 115 a prediction using the machine vision model, and to tune 116 and control the other components as needed. In an embodiment, each of the components of FIG. 1 identified above comprises an identifiable set of executable instructions, organized as one or more methods, classes, programmatic objects, procedures, subroutines or other software elements. Thus, in some embodiments, capture 102 may be denoted capture instructions or may comprise a capture method, class, procedure or routine. In some embodiments, source data 101, execution system 105 and dashboard & API 117 may represent separate execution threads or processes.

The capture 102 component is programmed to support the digitization, creation, and storage of digital assets. Objects and images are digitized. Assets, scenes, environments, maps, and cameras are created. Existing digital assets may be imported into storage.

The configure 103 component is programmed to support the preparation of assets for sampling and generation by configuring asset attributes. Assets are configured for different pose states and points of interest for cameras to target. Scenes are configured for different points of interest locations for asset placement and points of interest locations for camera placement. Desired output settings and annotated labels are configured for the assets and scenes. Different lighting setups can be represented in different scenes with varying lighting.

The library 104 is programmed to provide storage and access of but not limited to assets, scenes, environment maps, camera profiles, annotation settings, images and datasets.

The library catalog 106 component is programmed to provide a set of configuration options for assets and scenes in the library 104 to be sampled. The sample 107 component is programmed to select combinations of parameters from the set of parameter choices provided by the library catalog 106 and creates synthetic dataset parameters. In an embodiment, the synthetic dataset parameters are composed of examples needed to create a dataset, with each example having the required parameters to configure digital assets and scenes to render an example image for the dataset. In an embodiment, the dataset is composed of real-world examples, with each parameter value reflecting the real-world examples. In an embodiment, the dataset is composed of both synthetic and real-world examples, with each parameter value reflecting its corresponding example. Dataset parameters are created for train 110, validate 111, and test 114 components.

The generate 108 component is programmed to use the example parameters from the synthetic dataset parameters with computer graphics software and library 104 assets to create a synthetic dataset example image. In one embodiment, Houdini from Side Effects may be used as the computer graphics software. A synthetic dataset is compiled from many example images and metadata. Datasets are created for train 110, validate 111, and test 114 components.

The trial configuration 109 component is programmed to configure multiple machine learning trials based on settings from dashboard and API component 117. The configuration for different trials is used by the train 110 component to create a machine learning model. Attributes of each example is learned and compared with stored attributes. Machine learning software and techniques are used to create a trained model. Each trial is trained separately. The validate 111 component evaluates the predicted result and computes the intersection over union of the model for many specific combinations of assets and parameters. Each trial is validated separately.

The score 112 component is programmed to compute the performance of the asset and parameter combinations for each trial and is compared against the success criteria specified by the dashboard and API 117 component. The adaptive synthetic data control (ASDC) 113 component is programmed to determine how much more data is needed based on the composite score and success criteria specified by the dashboard and API 117 component. The tune 116 component is programmed to provide status information on the state of the execution system 105 and may indicate a need for additional sources of data. Settings such as dataset size and hyperparameter values may be updated before rerunning components the execution system 105. The score 112, ASDC 113, and tune 115 components together are programmed as an adaptive feedback loop to improve the dataset and training of the machine learning model.

The test 114 component is programmed to compute a final performance metric of the trained model. The infer 115 component is programmed to deploy the trained model for use.

The dashboard and API 117 component provide an interface to the system 100. In an embodiment, the dashboard has the status and state on the entire system 100 and provides dialogs for user input. An API provides an interface to get and set state values for system parameters, requirements, control execution and receive status updates for the system 100. Hyperparameter and trial values may be configured with the dashboard and API 117 component.

Figure 4:
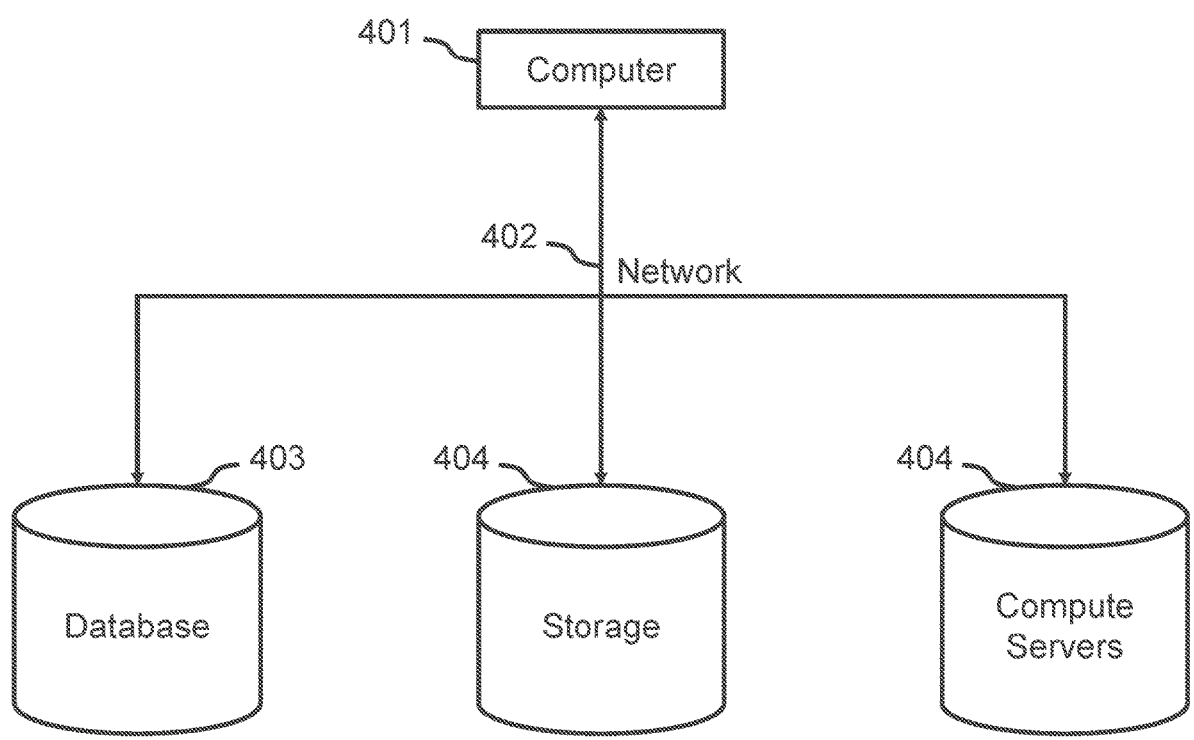
FIG. 4 is a block diagram of an exemplary environment in which the system can operate in accordance with one or more embodiments.

Referring now to FIG. 4, in one embodiment, system 100 may be executed on a system of computers 401, storage 404, database 403, compute servers 404 and networks 404 as described in FIG. 4. In some embodiments, distributed computer systems, cloud computing instances or other forms of virtual computing centers may be used to execute one or more components of FIG. 1.

Figure 2:
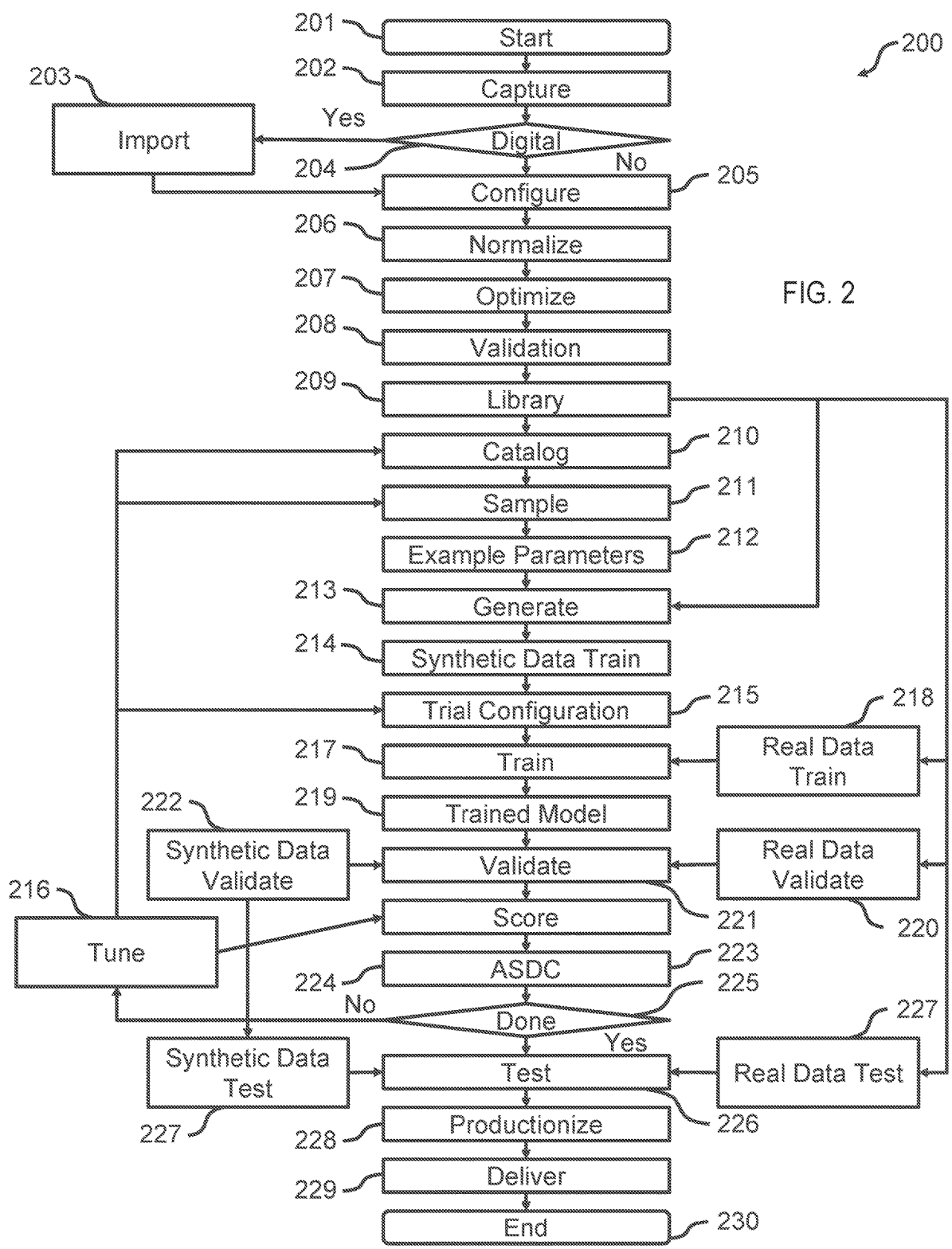
FIG. 2 illustrates a flow diagram of a method for capture and adaptive data generation for training machine vision in accordance with one or more embodiments.

FIG. 2 illustrates a flow chart of an example method for 200 the capture and adaptive data generation for training machine vision. FIG. 2 comprises an example algorithm, plan or specification for programming the components of FIG. 1, and is expressed at the same level of detail as used by those of ordinary skill in the art to which this disclosure pertains to enable communication among themselves about how to make, use or code an implementation. While aspects of FIG. 2 are expressed in functional language, FIG. 2 is expressed at the same level of detail as normally used in the field to provide a clear starting point for persons having ordinary skill in the art to write, test, debug and deploy one or more methods, classes, objects, procedures, subroutines or other software elements to implement a working embodiment of the functions that are described.

The beginning of the method is at the start 201. The method proceeds to the capture 202 process that uses traditional computer graphics tools and techniques to capture assets that will become part of the library 104. The inputs to the capture 202 process includes but are not limited to real-world objects and existing digital collections.

A decision step 204 is made depending on whether or not the asset exists in digital form. A yes decision results in a path to import 203 and a no decision results in the continuation of the capture process into the next step of configure 205. In one embodiment, the capture of 2D images involves taking a photo of the object if it doesn't already exist digitally, then converting the digital images to common file format such as PNG and import 203 to storage.

Photogrammetry techniques are used to create 3D models if such models do not already exist digitally. In another embodiment 3D models are created by hand using computer graphics software and tools, then the digital 3D models are converted to standard formats such as USD and imported 203 to storage.

For real-world physical scenes, photogrammetry techniques are used to capture the scene. 3D can also be created using interactive computer graphics software, with captured 3D scene as references if available, followed by converting the 3D scene to standard formats such as USD and import 203 to storage. The lighting may be captured from real-world environments into environments maps. The environment map may be converted to a standard format such as HDRI and imported 203 to storage. Camera characteristics may be captured by measuring the lens distortion and color behavior from reference charts, such as a grid or Macbeth color chart. The measurements are converted to standard formats such as SPI3D and imported 203 to storage. Existing datasets are imported 203 to storage. The asset metadata in the database is updated.

In one embodiment of a process for photogrammetry of a 3D model, many photos of a subject are taken with a high-quality camera from many viewpoints at the same time. HDRI capture is made by a bracketed photo sequence from a single viewpoint of the subject, mirrored ball, diffuse ball, and color calibration chart with a range of exposures. An HDRI floating point bitmap is assembled from multiple exposure images, then compressed and saved into the EXR file format. After adjusting for exposure, a least squared color transform is computed from the color chart in the HDRI and reference chart values and is saved as a color calibration matrix. Color swatch measurements for materials to be used for surface material decomposition are made by an operator or an API to find colors in a color spaces such as R,G,B in the rec 2020, rec 709, SRGB color spaces, or the CIE L*a*b space with a D50 white point. In an embodiment, ground truth swatch measurements are captured using a spectrophotometer. Additionally, the color swatch can be labeled using the center point and radius, polyline, or mask image. The illumination measurement is computed by calculating the average color of the diffuse ball or the mirror ball scaled by a Fresnel based scaling factor from a crop of balls from the calibrated HDRI. A 3D mesh is generated using commonly available Photogrammetry tools to compute a high-resolution 3D mesh and mapped texture. Environment illumination is scaled by the illumination measurement and baked to UV space using off the shelf computer graphics rendering tools.

Using surface material decomposition, the textures of the models can be replaced with high quality material driven by the captured textures. The inputs to surface material decomposition are the list of named materials and corresponding measured swatches [MC], a captured ST space texture map in scene referred color space [C], and baked illumination in the form of a ST space texture map [I]. Color calibration is performed using the saved matrix on the incoming texture map.

In an embodiment, the diffuse albedo [A] is estimated using a process programmed in software by dividing the scene referred texture map values by the illumination map values [A=C/I]. For each of the color swatch materials, the process computes the median albedo color [MA=median (A[xmin→xmax, ymin→ymax)]. An albedo color calibration step is used to combat any color processing error introduced during the photogrammetry step. For every color material color swatch [i], the process is programmed to look up the median color of the base albedo swatch [MA[I]] and based color swatch from HDR input [MC[I]], then the process is programmed to correct the albedo [A=A*(MC[i]/MA[i])]. To find the dominant material per pixel, the process is programmed to compute the per pixel distance from the corrected albedo to color to every median albedo [MA[j] D_A_MA] color of each material swatch. For every median albedo λMA[j]] and every albedo pixel [A[x,y]], the process is programmed to compute the distance [D_A_MA[x,y,j] =MA[j]−A[x,y]]. Then for every pixel [x,y], the process is programmed to find the argument of the minimum of albedo [argmin(D_A_MA[x,y])]. Then the dominant material per pixel map can be used to create a base albedo map [BA] of each material.

To create the map for all pixels where the dominant albedo is the given material [D_A_MA[x,y]==i], the base albedo map is the value of the albedo map [BA[x,y=A[x,y]]. The base albedo map can be filled in [D_A_MA[x,y]]!=i] using a push-pull interpolation algorithm [BA[x,y]=push pull(BA)]. In a loop over each material index [k], the albedo is decomposed into a base color [MA[k]] and blend weight images [W[k]]. To decompose albedo images into blending weight images [W[k][x,y]], for each secondary index [k] in median albedo color [MA] the process is programmed to calculate a scalar projection of the albedo onto the base color [WBS[x,y]] using the secondary color [MA[k]] as an origin point. Then for every pixel [x,y], the process is programmed to compute the color difference [V1] between the base albedo color [BA[x,y]] and the secondary median albedo color [MA[k]], and the process is programmed to compute the color difference [V2] between the diffuse albedo [A[x,y] and the secondary median albedo color [MA[k]]. The blending weight image [W[k][x,y]] is the dot product of the absolute value of the base albedo color difference [V1] and diffuse albedo difference [V2] divided by the length of the base color difference [W[k][x,y]=(|V1|·V2)/length (V1)]. The weights are then normalized for the entire weight image by computing the sum of weights for the entire image [N[x,y]=sum(W[k][x,y])] and dividing all the all the weights per pixel by the sum [W[k][x,y]=W[k][x,y]/N[x,y])]. Lastly the weight image [W[k]] and colors [MA[k]] is saved out for the captured asset. The loop proceeds to the next material index [k].

To optimize the photogrammetry models, retopology and surface fitting tools are to clean up the geometry. Existing optimized meshes can be fitted to dense meshes, estimating the position and scale by oriented bounding boxes or Procrustes analysis of matching points. High resolution texture and normal data can be applied to the optimized surfaces. To transfer texture from high resolution meshes to lower resolution optimized meshes, the normal map information is encoded in tangent space, displacement maps are stored along the normal vector, and all weight images W[k], must be resampled into the new ST coordinates.

Photogrammetry for a 3D scene follows the same steps as a single 3D model, photo with a high-quality camera, HDRI capture, HDRI assembly, color calibration, color swatch measurement, illumination measurement, 3D mesh generation, and illumination baking. This yields a single, unordered agglomeration of triangles representing many models. A segmentation is needed to separate each conceptual model. In one embodiment, K-Means squared vertex clustering analysis, programmed in software, is applied to position, color, and normal vertex. Then using the material swatches [MC], for each cluster [j] the process is programmed to find the mean color [CC] and Gabor Texture Flow [CFT]. Then for each material [MC[i]] the process is programmed to compute the difference between the material swatch color and mean color of each cluster [D[i]=MC[i]−CC]. Then the process is programmed to find the argument minimum [k] of D for each cluster [k=argmin(D)] and append to the computed colors [CC, CFT] for each cluster to material swatch of the argument minimum [MC[k]]. Then for each material index [i], the process is programmed to compute the histogram of mean colors to compute a Gabor texture flow of the histogram. Then the process is programmed to match all the swatch material [MC[i]] to the mean color [CC[j]] and assign all the triangles to material swatch group [i].

Referring again to FIG. 2, in an embodiment, configure 205 process creates assets that are parameterized by a single parameter, the asset state. In one embodiment, the asset state is determined by the combination of asset attributes such as scale, material properties (color, textures, BSSRDF), deformation, mesh parameterization, and camera points of interests as specified by the operator. A scene is parameterized by a list of assets and a list of cameras for the scene attributes of scale, materials properties (color, textures, BSSRDF), lighting, asset points of interest, and camera points of interest. The scene is tagged for the dataset target (Train 217, Validate 221, Test 226). An environment map is configured for the target dataset target (Train 217, Validate 221, Test 226). Annotation outputs states are configured, to provide annotations for different outputs. Outputs images include masks such as object IDs and segmentation, depth, color, or custom masks. Output metadata include, positions and alignment, labels, hierarchy. Quality settings for the output, such as render samples per pixel and resolution. The set of parameters (with optional minimum and maximum values), that describe the dataset constitute the parameter space.

The normalize 206 step conforms the assets into a common format for use with the computer graphics software. The assets are scaled to a common unit scale and scene referred color space. The optimize 207 step improves the performance of the assets by techniques such as down sampling, data compressing, creating level of detail versions to reduce complexity and caching of the assets. The validation 208 step checks the assets and scenes before being used in the system and gathers test results to be recorded in a database. The library 209 step assets and data are entered into the library 104 component. The assets and data along with associated metadata are tracked, include the storage location for the assets and data. The library catalog 210 creates an asset catalog list, scene catalog list, and hand labeled example catalog list. The asset catalog list is created by appending the list of possible asset states, camera points of interest, valid camera to place at each camera point of interest for every asset in the library 104. The scene catalog list is created by appending the list of possible asset points of interest, camera points of interest, possible assets to be placed at each asset point of interests and valid cameras to place at each camera point of interest for every scene in the library 104. Hand labeled example catalog list is created by appending every hand labeled example in the library 104.

The sample 211 process creates a sequence of example parameters of length sequence size. A machine vision dataset is made up of example images. Each parameter sample contains the parameters to configure a 3D scene to render a valid example image. All the samples must have a range of parameter samples to provide variation to stand in for all possible views, lighting conditions, states for a machine vision dataset. An example is either an Iconic example that is detailed with minute differences between similar assets or an In Situ example that contains contextual information to differentiate assets from surroundings.

Each Iconic example is specified by 9 parameters; camera view choice [CV] as one of a set, camera view orientation offset [Ctheta, Cphi] range that estimates the spatial domain from a point of interest, environment choice [E] as one of a set, environment orientation coordinates [Etheta, Ephi, Erho] with range −pi to pi, −pi/2 to pi/2, −pi to pi respectively, asset choice [AC] as one of a set, asset state values [P] as one of a set. The set of parameters (CV, E, Ctheta, Cphi, Etheta, Ephi, Erho, AC, P), constitutes the parameter space for an Iconic dataset.

Dense Validation Output is an association of the sample data with the outcome from the previous validation iteration. Global PDF is the probability density function for the first Parameter Choice used to choose assets or scenes that need refinement. Global Sequential PDFs contain the conditional probability of parameters where the probability of a choice is parameterized by previous choices. Local Cluster PDFs is a data structure that provides access to parameters and is sampled by a single random variable. Local Spatial PDFs is a data structure that provides access to parameters and is sampled by a random variable vector of spatial parameters. Global Hand Labeled Example PDF is a probability density function for the Hand labeled example choices.

Each In Situ example is specified by base of seven parameters plus eight parameters for each different asset [N] to be varied; scene choice [S] as one of a set, asset choices [AS*] as vector of size with size [N] with each element as one of a set, asset state values [P*] as a vector with size [N] with each element as one of a set, asset offset translations [Abe, Aty*, Atz*] vector size [N] with range of spatial domain for a point of interest, asset offset orientations [Arx*, Ary*, Arz*] vector size [N] with range −pi to pi, −pi/2 to pi/2, −pi to pi, camera view choice [CV] one of a set, camera view offset translation [CTx, Cty, CTz] range of that estimates the spatial domain from a point of interest, camera view orientation offset [Ctheta, Cphi] range that estimates the spatial domain from a point of interest. In an embodiment, the environment choice can be represented by an environment map as the light source and context for the data generation. The set of parameters (S, AS[N], P[N], Atxyz[N], Arxyz[N], CV, Ctxyz[N], Ctheta, Cphi), constitutes the parameter space for an In Situ dataset.

In an embodiment, datasets may be composed of a combination of In Situ and Iconic examples. In this case each example first draws a single choice [G] between In Situ and Iconic sampling. Composed In Situ and Iconic datasets are characterized by the union of the parameter spaces for each approach and the choice G.

In one embodiment a Single Choice is made by computing the cumulative distribution function (CDF) of the choice distribution by numerical integration of a probability density function (PDF). Uniform samples between 0 to 1 [X] are drawn using a seeded, scrambled Halton sequence that covers the domain with typically fewer samples. Other methods to generate pseudo-random sequences can be used such as the Mersenne Twister and the scrambled Sobol. Remap the samples [X] by the CDF value [Y] for each sample. Quantize the remapped values [Y] into number [N] bins. In FIG. 6 an example probability density function 600 is applied to a Halton sequence to using the Single Choice method 601.

In an embodiment, the first iteration for Iconic parameter sampling a Sequential Choice Refinement method is used with uniform weights. The Global Asset PDF and Global Sequential PDFs is initialized to uniform distributions. While the sequence is not full, floating point number samples are drawn for asset sample [qA], asset state sample [qP], environment sample [qE], camera view sample [qCV], camera orientation coordinates samples [Ctheta, Cphi], and environment orientation coordinates samples [Etheta, Ephi, Erho]. The asset choice [AC] is the result from a Single Choice using the uniform Global Asset PDF and asset sample [qA]. Select an asset state PDF [PPDF] is the Global Sequential PDF for the asset choice [AC]. The asset state choice [P] is the result from the Single choice using the asset state PDF [PPDF] with the asset state sample [qP]. An environment PDF [EPDF] is the Global Sequential PDF for the asset choice [AC] and asset state [P]. The environment choice [E] is the Single Choice of the environment PDF [EPDF] and the environment sample [qE]. A camera view PDF [CPDF] is the Global Sequential PDF for the asset choice [AC], asset state [P], and environment [E]. A camera view choice [CV] is the Single Choice of the camera view PDF [CPDF] and the camera view sample [qCV]. The values for asset choice [A], asset state choice [P], environment choice [E], camera view choice [CV], camera view orientation offset samples [Ctheta, Cphi], and environment orientation coordinates samples [Etheta, Ephi, Erho] are added to the sequence and repeated until the sequence is full.

For other subsequent iterations, use the Single Choice with user specified weights to draw a sample [q] to pick between three refinement strategies, Sequential Choice Refinement, Local Cluster Refinement, or Dense Validation Output Refinement. The PDFs are calculated from the previous iteration's score 223 process are used.

If Sequential Choice Refinement is selected, while the sequence is not full, floating point number samples are drawn for candidate sample [qx], asset sample [qA], asset state sample [qP], environment sample [qE], camera view sample [qCV], camera orientation coordinates samples [Ctheta, Cphi], and environment orientation coordinates samples [Etheta, Ephi, Erho]. The asset choice [AC] is the result from a Single Choice using the uniform Global Asset PDF and asset sample [qA]. An asset state PDF [PPDF] is the Global Sequential PDF for the asset choice [AC]. The asset state choice [P] is the result from the Single choice using the asset state PDF [PPDF] with the asset state sample [qP]. An environment PDF [EPDF] is the Global Sequential PDF for the asset choice [AC] and asset state [P]. The environment choice [E] is the Single Choice of the environment PDF [EPDF] and the environment sample [qE]. A camera view PDF [CPDF] is the Global Sequential PDF for the asset choice [AC], asset state [P], and environment [E]. A camera view choice [CV] is the Single Choice of the camera view PDF [CPDF] and the camera view sample [qCV]. A rejection test is applied to the candidate sample [qx] by testing a density function created from a n-dimensional interpolation of the full sequence for all parameters of the previous iteration as a Dense Validation Output [D]. If the value of the candidate sample [qx] is within the Dense Validation Output [D] then the process is programmed to add the values for asset choice [AC], asset state choice [P], environment choice [E], camera view choice [CV], camera view orientation offset samples [Ctheta, Cphi], and environment orientation coordinates samples [Etheta, Ephi, Erho] and repeated until the sequence is full. Otherwise the process is programmed to reject and draw new samples and repeat.

If Local Cluster Refinement is selected, while the sequence is not full, floating point number samples are drawn for candidate sample [qx], cluster sample [z], asset sample [qA], asset state sample [qP], environment sample [qE], camera view sample [qCV], camera orientation coordinates samples [Ctheta, Cphi], and environment orientation coordinates samples [Etheta, Ephi, Erho]. The asset PDF [APDF] is the result from a Single Choice using local asset cluster PDF and cluster sample [z]. The asset state PDF [PPDF] is the result form a Single Choice using the local asset state PDF and cluster sample [z]. The environment PDF [EPDF] is the result from a Single Choice using the local environment cluster PDF and cluster sample [z]. The camera view PDF [CPDF] is the result from a Single Choice using the local camera cluster PDF and cluster sample [z]. The asset choice [AC] is the result from a Single Choice using the asset PDF [APDF] and asset sample [qA]. The asset state choice [P] is the result from a Single Choice using the asset state PDF [PPDF] and asset state sample [qP]. The environment choice [E] is the result from a Single Choice using the environment PDF [EPDF] and environment sample [qE]. The camera view choice [CV] is the result from a Single Choice using the camera view PDF [CPDF] and camera view sample [qCV]. A rejection test is applied to the candidate sample [qx] by testing a density function created from a n-dimensional interpolation of the full sequence for all parameters of the previous iteration as a Dense Validation Output [D]. If the value of the candidate sample [qx] is within the Dense Validation Output [D] then the process is programmed to add the values for asset choice [AC], asset state choice [P], environment choice [E], camera view choice [CV], camera view orientation offset samples [Ctheta, Cphi], and environment orientation coordinates samples [Etheta, Ephi, Erho] and repeated until the sequence is full. Otherwise the process is programmed to reject and draw new samples and repeat.

If Dense Validation Output is selected, the process is programmed to create a stored vector of Dense Validation Output Fail [DVOF] cases. While the sequence is not full, floating point number samples are drawn for candidate sample [qx], cluster sample [z], camera orientation coordinates samples [Ctheta, Cphi], and environment orientation coordinates samples [Etheta, Ephi, Erho]. The process is programmed to select a fail case using the Dense Validation Output Fail [DVOF] and the cluster sample [z] get a previously failed case's asset choice [A], asset state choice [P], environment choice [E], and camera view [CV]. A rejection test is applied to the candidate sample [qx] by testing a density function created from a n-dimensional interpolation of the full sequence for all parameters of the previous iteration as a Dense Validation Output [D]. If the value of the candidate sample [qx] is within the Dense Validation Output [D] then the process is programmed to add the values for asset choice [AC], asset state choice [P], environment choice [E], camera view choice [CV], camera view orientation offset samples [Ctheta, Cphi], and environment orientation coordinates samples [Etheta, Ephi, Erho] and repeated until the sequence is full. Otherwise the process is programmed to reject and draw new samples and repeat.

In an embodiment, the first iteration for In Situ parameter sampling a Sequential Choice Refinement method is used with uniform weights. The Global Asset PDF and Global Sequential PDFs is initialized to uniform distributions. While the sequence is not full, floating point number samples are drawn for scene sample [qS], camera view sample [qCV], camera orientation coordinates samples [Ctheta, Cphi], and camera view offset translation [CTx, Cty, CTz]. The scene choice [S] is the result from the Single choice using the Global Scene PDF and scene sample [qS]. A camera view PDF [CPDF] is the Global Sequential PDF for the scene choice [S]. The camera view choice [CV] is the result from the Single Choice using the camera view PDF [CPDF]. While the asset parameter sequence has fewer than the maximum number of assets in the scene, the process is programmed to draw samples for asset sample [qA] and asset state sample [qP]. An asset PDF [APDF] is the Global Sequential PDF for the scene choice [S] and camera view choice [CV]. The asset choice [AC] is the result from a Single Choice using the uniform asset PDF [APDF] and asset sample [qA]. An asset state PDF [PPDF] is the Global Sequential PDF for the scene choice [S], camera view choice [CV], and asset choice [AC]. The asset offset translations [Atx, Aty, Atz] and asset offset orientation [Arx, Ary, Arz] are sequentially queried from points of interest specified in the scene [S]. The process is programmed to append the values for asset choice [AC], asset state choice [P], asset offset translations [Atx, Aty, Atz], and asset offset orientation [Arx, Ary, Arz] to the asset parameter sequence. The process is programmed to repeat the asset parameter process until all points of interest in the scene [S] are filled. The process is programmed to append the scene choice [S], camera view choice [CV], camera orientation coordinates samples [Ctheta, Cphi], and camera view offset translation [CTx, Cty, CTz], and asset parameter sequence to the example parameter sequence.

For other subsequent iterations, the process is programmed to use the Single Choice with user specified weights to draw a sample [q] to pick between three refinement strategies, Sequential Choice Refinement, Local Spatial Refinement, Local Cluster Refinement, or Dense Validation Output Refinement. The PDFs are calculated from the previous iteration's score 223 process are used.

If Sequential Choice Refinement is selected, while the sequence is not full, floating point number samples are drawn for candidate scene sample [qxS], scene sample [qs], camera view sample [qCV], camera orientation coordinates samples [Ctheta, Cphi], and camera view offset translation [CTx, Cty, CTz]. The scene choice [S] is the result from the Single choice using the Global Scene PDF and scene sample [qS]. A camera view PDF [CPDF] is the Global Sequential PDF for the scene choice [S]. The camera view choice [CV] is the result from the Single Choice using the camera view PDF [CPDF]. A rejection test is applied to the candidate scene sample [qxS] and a validation bias from user specified parameters by testing a density function created from a n-dimensional interpolation of the choices for scene sample [S], camera view [CV], camera orientation coordinates samples [Ctheta, Cphi], and camera view offset translation [CTx, Cty, CTz] of the previous iteration as a Dense Validation Output [D]. If the value of the candidate sample [qxS] is within the Dense Validation Output [D] then the process is programmed to proceed to sample the asset parameters sequence. Otherwise the process is programmed to discard the sample and repeat. While the asset parameter sequence for has fewer than maximum number of asset in the scene, the process is programmed to draw samples for asset sample [qA] and asset state sample [qP]. An asset PDF [APDF] is the Global Sequential PDF for the scene choice [S] and camera view choice [CV]. The asset choice [AC] is the result from a Single Choice using the uniform asset PDF [APDF] and asset sample [qA]. An asset state PDF [PPDF] is the Global Sequential PDF for the scene choice [S], camera view choice [CV], and asset choice [AC]. The asset offset translations [Atx, Aty, Atz] and asset offset orientation [Arx, Ary, Arz] and sequentially queried from points of interest specified in the scene [S]. The process is programmed to append the values for asset choice [AC], asset state choice [P], asset offset translations [Atx, Aty, Atz], and asset offset orientation [Arx, Ary, Arz] to the asset parameter sequence. The process is programmed to repeat the asset parameter process until all points of interest in the scene [S] are filled. The process is programmed to append the scene choice [S], camera view choice [CV], camera orientation coordinates samples [Ctheta, Cphi], and camera view offset translation [CTx, Cty, CTz], and asset parameter sequence to the example parameter sequence.

If Local Spatial Refinement is selected, while the sequence is not full, floating point number samples are drawn for candidate scene sample [qxS], scene sample [qs], camera view sample [qCV], camera orientation coordinates samples [Ctheta, Cphi], and camera view offset translation [CTx, Cty, CTz]. The scene PDF [SPDF], camera view PDF, asset PDF [APDF], asset state PDF [PPDF] is the Local Spatial PDF for the camera view orientation offset samples [Ctheta, Cphi] and environment orientation coordinates samples [Etheta, Ephi, Erho]. The scene choice [S] is the result from the Single choice using the scene PDF [SPDF] and scene sample [qS]. The camera view choice [CV] is the result from the Single Choice using the camera view PDF [CPDF]. A rejection test is applied to the candidate scene sample [qxS] and a validation bias from user specified parameters by testing a density function created from a n-dimensional interpolation of the choices for scene sample [S], camera view [CV], camera orientation coordinates samples [Ctheta, Cphi], and camera view offset translation [CTx, Cty, CTz] of the previous iteration as a Dense Validation Output [D]. If the value of the candidate sample [qxS] is within the Dense Validation Output [D] then the process is programmed to proceed to sample the asset parameters sequence. Otherwise the process is programmed to discard the sample and repeat.

While the asset parameter sequence for has fewer than the maximum number of assets in the scene, the process is programmed to draw samples for asset sample [qA] and asset state sample [qP]. An asset PDF [APDF] is the Global Sequential PDF for the scene choice [S] and camera view choice [CV]. The asset choice [AC] is the result from a Single Choice using the uniform asset PDF [APDF] and asset sample [qA]. An asset state PDF [PPDF] is the Global Sequential PDF for the scene choice [S], camera view choice [CV], and asset choice [AC]. The asset offset translations [Atx, Aty, Atz] and asset offset orientation [Arx, Ary, Arz] and sequentially queried from points of interest specified in the scene [S]. Append the values for asset choice [AC], asset state choice [P], asset offset translations [Atx, Aty, Atz], and asset offset orientation [Arx, Ary, Arz] to the asset parameter sequence. The process is programmed to repeat the asset parameter process until all points of interest in the scene [S] are filled. The process is programmed to append the scene choice [S], camera view choice [CV], camera orientation coordinates samples [Ctheta, Cphi], and camera view offset translation [CTx, Cty, CTz], and asset parameter sequence to the example parameter sequence.

If Local Spatial Refinement is selected, while the sequence is not full, the process is programmed to draw floating point number samples for candidate scene sample [qxS], scene sample [qs], camera view sample [qCV], cluster sample [z], scene sample [qs], camera view sample [qCV], camera orientation coordinates samples [Ctheta, Cphi], and camera view offset translation [CTx, Cty, CTz]. The scene PDF [SPDF] is the result from a Single Choice using local asset cluster PDF and cluster sample [z]. The asset PDF [APDF] is the result from a Single Choice using local asset cluster PDF and cluster sample [z]. The asset state PDF [PPDF] is the result form a Single Choice using the local asset state PDF and cluster sample [z]. The camera view PDF [CPDF] is the result from a Single Choice using the local camera cluster PDF and cluster sample [z]. The scene choice [S] is the result from the Single choice using the scene PDF [SPDF] and scene sample [qS]. The camera view choice [CV] is the result from the Single Choice using the camera view PDF [CPDF]. A rejection test is applied to the candidate scene sample [qxS] and a validation bias from user specified parameters by testing a density function created from a n-dimensional interpolation of the choices for scene sample [S], camera view [CV], camera orientation coordinates samples [Ctheta, Cphi], and camera view offset translation [CTx, Cty, CTz] of the previous iteration as a Dense Validation Output [D]. If the value of the candidate sample [qxS] is within the Dense Validation Output [D] then the process is programmed to proceed to sample the asset parameters sequence. Otherwise the process is programmed to discard the sample and repeat.

While the asset parameter sequence for has fewer than the maximum number of assets in the scene, the process is programmed to draw samples for asset sample [qA] and asset state sample [qP]. An asset PDF [APDF] is the Global Sequential PDF for the scene choice [S] and camera view choice [CV]. The asset choice [AC] is the result from a Single Choice using the uniform asset PDF [APDF] and asset sample [qA]. An asset state PDF [PPDF] is the Global Sequential PDF for the scene choice [S], camera view choice [CV], and asset choice [AC]. The asset offset translations

[Atx, Aty, Atz] and asset offset orientation [Arx, Ary, Arz] and sequentially queried from points of interest specified in the scene [S]. The process is programmed to append the values for asset choice [AC], asset state choice [P], asset offset translations [Atx, Aty, Atz], and asset offset orientation [Arx, Ary, Arz] to the asset parameter sequence. The process is programmed to repeat the asset parameter process until all points of interest in the scene [S] are filled. The process is programmed to append the scene choice [S], camera view choice [CV], camera orientation coordinates samples [Ctheta, Cphi], and camera view offset translation [CTx, Cty, CTz], and asset parameter sequence to the example parameter sequence.

If Dense Validation Output is selected, the process is programmed to create a stored vector of dense validation output fail [DVOF] cases. While the sequence is not full, the process is programmed to floating point number samples are drawn for cluster sample [z], camera orientation coordinates samples [Ctheta, Cphi], and camera view offset translation [CTx, Cty, CTz]. The process is programmed to select a fail case using the dense validation output fail [DVOF] and the cluster sample [z] get a previously failed case's scene [S], camera view [CV], asset choices [AS*], asset state values [P*], asset offset translations [Atx*, Aty*, Atz*], asset offset orientations [Arx*, Ary*, Arz*]. While the asset parameter sequence is not full, the process is programmed to draw samples for asset offset translations sample [ATOx, ATOy, ATOz] and asset offset orientations sample [AROx, AROy, AROz]. For every asset in the scene, the process is programmed to adjust the asset offset translations [Atx, Aty, Atz] by adding asset offset translations sample [ATOx, ATOy, ATOz] and asset offset orientations [Arx, Ary, Arz] by adding asset offset orientations sample [AROx, AROy, AROz]. The process is programmed to append the scene choice [S], camera view choice [CV], camera orientation coordinates samples [Ctheta, Cphi], and camera view offset translation [CTx, Cty, CTz], and asset parameter sequence to the example parameter sequence.

In an embodiment, Hand Labeled example data sequence can be used. All hand labeled example parameters [H] should be used for every iteration, but it is reordered. Knuth's shuffle can be used to reorder the sequence. Hand labeled example data can be used to generate process 213 or refer to existing example data in the Library 104 that has been previously generated or from real-world data.

In an embodiment, Multiple Parameter Sampling approach can be used with a combination of Iconic parameter sampling, In Situ parameter sampling, and shuffled Hand Labeled sequence. The process is programmed to use Single Choice with user specified weights to draw a sample [q] to pick between the different strategies. If Iconic parameter sampling is selected, the process is programmed to get parameters for asset choice [AC], asset state choice [P], environment choice [E], camera view choice [CV], camera view orientation offset samples [Ctheta, Cphi], and environment orientation coordinates samples [Etheta, Ephi, Erho] and add to the example parameter sequence. If In Situ parameter sampling is selected, the process is programmed to get the scene choice [S], camera view choice [CV], camera orientation coordinates samples [Ctheta, Cphi], and camera view offset translation [CTx, Cty, CTz], and asset parameter sequence and add to the example parameter sequence. If shuffled Hand Labeled sequence is selected, the process is programmed to remove an example [H] from the shuffles Hand Labeled sequence and appended to the example parameter sequence.

In an embodiment, as part of the process for sample 211, stats are computed. The process is programmed to compute a histogram of Iconic assets [AC] and asset state [P] combinations in sequence. The process is programmed to compute a histogram of environments in sequence. The process is programmed to compute a histogram of Scenes [S] in sequence. The process is programmed to compute a histogram of scene asset [AS] and asset state [P] combinations in sequence.

In an embodiment, to create the separate datasets in the sample 211 process, the process is programmed to use the Multiple Parameter Sampling approach to create separate dataset targets (Train 217, Validate 221, Test 226). Each dataset draws from data from the Library Catalog separately.

The generate 213 process creates a dataset using the example parameters 212 for the different dataset targets (Train 217, Validate 221, Test 226). Using commonly available computer graphics software, setup a project based on the example parameters from the dataset parameters to generate an example. The example parameters 212 are used identify and load assets into a project, modify asset attributes, setup camera and lighting, and specify the render output settings. An example image and annotations are created using rendering software. Multiple example image and annotation are assembled into the corresponding dataset targets (Train 217, Validate 221, Test 226) as a synthetic data train 214 dataset, synthetic data validate 222 dataset, and synthetic data test 227 dataset.

The trial configuration 215 process creates a number of machine learning trials using generally available software and practices to create a configuration for train 217, validate 221, and test 226. The train configuration 215, synthetic data train 216 dataset, real data train 218 dataset, and training model are used in the train 217 process to create a machine learning model.

Figure 3:
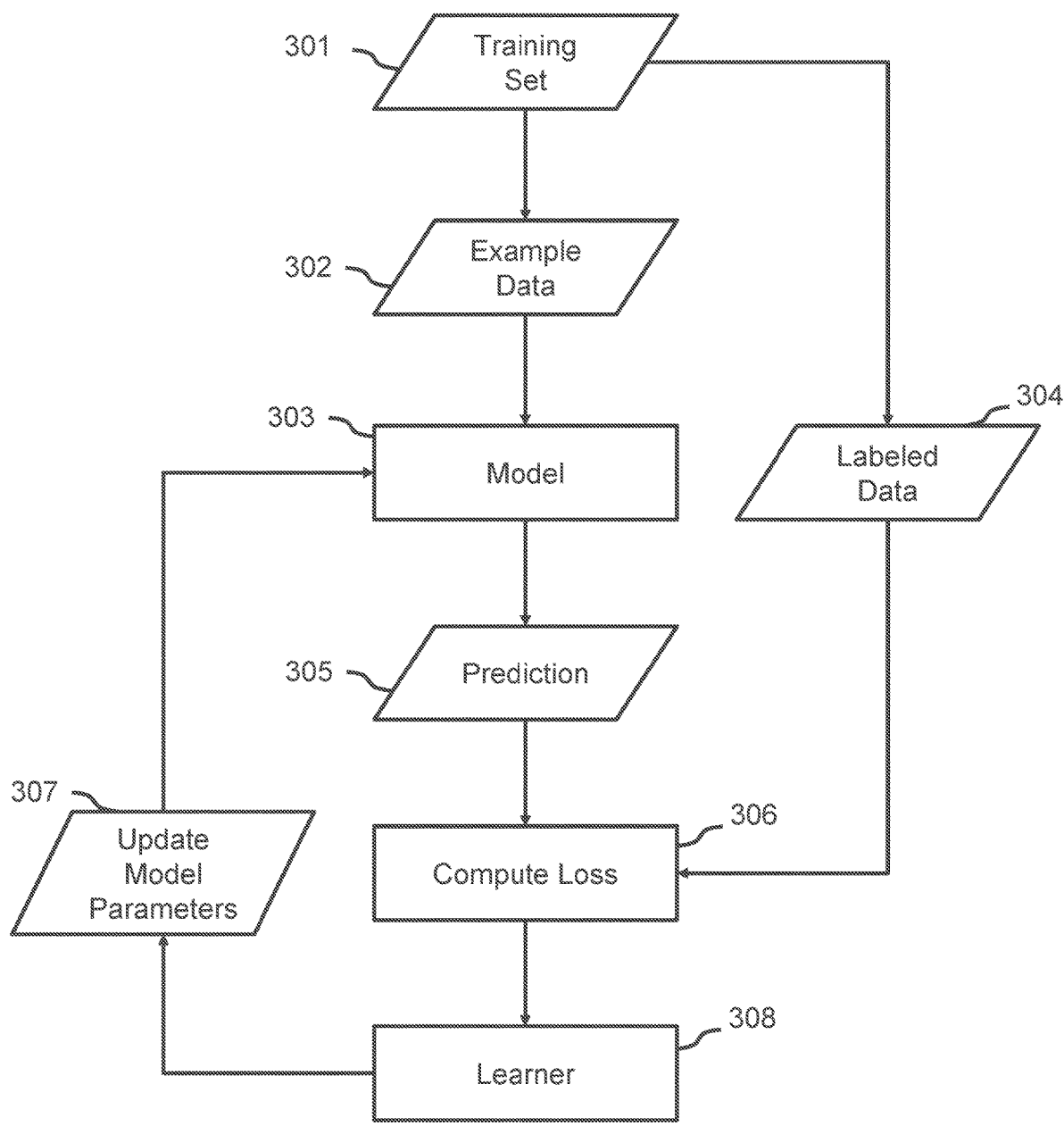
FIG. 3 illustrates a flow diagram of a method for machine vision training in accordance with one or more embodiments.

FIG. 3 is an embodiment of a flow diagram of a method for machine vision training. The training method 300 consists of a training set 301, from which an example data 302 is selected to be used with the model 303 for forward propagation resulting in a prediction 305. A loss is computed 306, by measuring the prediction 305 results with the correct labeled data 304. Back propagation is applied to the loss to compute the analytic gradient in a learner 308 step to identify new parameters to reduce the loss. The new parameters are used to update the model parameter 307 in the model 303. The steps are repeated until the completion specified criteria.

The train 217 process creates a trained model 219 is used by a validate 221 process to compute an intersection over union value. Every example in the validation dataset, consisting of synthetic data validate 222 dataset and real-world data validate 220 dataset, is used to compute the intersection over union of the predicted value using the trained model 219 and ground truth from the dataset. The result of the validate 221 process is a Dense Validation Output that contains the intersection over union metric for every element of the validate 222 dataset.

The score 223 process takes the results from the validation 221 process as the Dense Validation Output, asset library annotations from the catalog 106, user setting for the minimum intersection over union as the threshold [MinIoU] for differences between ground truth and prediction, and the success criteria as the number of acceptable prediction failures and computes updated probability density functions to be used for the sample 221 process.

In an embodiment, the score 223 process is programmed to evaluate every trial of the validation 221 process. For every example image in the trial, the process is programmed to keep a sum of the intersection over union of each image as the total intersection over union [TrialIoU] and store the total intersection over union [TrialIoU] with each trial. At the same time, the process is programmed to test every example image's intersection over union [IoU] with the minimum intersection over union [minIoU]. If the intersection over union [IoU] is less than the minimum intersection over union [minIoU], the process is programmed to store each failure to be indexed with each example image.

In an embodiment, the process is programmed to find the trial with the highest total intersection over union [TrialIoU] and discard other trials. Then the process is programmed to compute the success or failure of the current iteration by keeping a sum of the number of success for each asset as a composite value of success. The asset is considered a failure if the failure count is greater than the success criteria. If the test is a failure, then the process is programmed to store a failure for the asset and the composite value of failure. Otherwise store the result as a success for the asset.

In an embodiment to compute the Global Asset PDF, the process is programmed to compute the histogram of failure for each asset by using an estimation of a probability density function of a choice from a histogram. This is done by defining the PDF and histogram and estimating the PDF as a scaled histogram. The process is programmed to store this as the Global Asset PDF. Then the process is programmed to compute the histogram of failure for each scene by using an estimation of probability density function of a choice from a histogram and this as the Global Scene PDF.

The process is programmed to compute the Global Asset Sequential PDFs by starting with each asset [AC]. Then the process is programmed to compute the histogram of failure for each asset state [P] and convert the histogram to a PDF and store the PDF in the Global Sequential table of PDFs as Global Sequential PDF for the asset [AC]. Then the process is programmed to for each asset state [P], compute the histogram of failure for each environment [E] and convert the histogram to a PDF. The PDF is stored in the Global Sequential table of PDFs as Global Sequential PDF for the asset [AC] and asset state [P]. Then the process is programmed to for each environment [E], compute the histogram of failure for each camera view [CV] and convert the histogram to a PDF. The PDF is stored in the Global Sequential table of PDFs as Global Sequential PDF for the asset [AC], asset state [P], and environment [E].

Next the process is programmed to compute the Global Scene Sequential PDFs by starting with each scene [S]. Then the process is programmed to compute the histogram of failure for each camera view [CV] and convert the histogram to a PDF and store the PDF in the Global Scene Sequential table of PDFs as Global Scene Sequential PDF for the scene [S]. Then for each camera view [CV], the process is programmed to compute the histogram of failure for each asset [AC] and convert the histogram to a PDF and store the PDF in the Global Scene Sequential table of PDFs as Global Scene Sequential PDF for the scene [S] and camera view [CV]. Then for each asset, the process is programmed to compute the histogram of failure for each asset state [P], convert the histogram to a PDF and store the PDF in the Global Scene Sequential table of PDFs as Global Scene Sequential PDF for the scene [S], camera view [CV], and asset [AC].

The process is programmed further to compute the Local Iconic Cluster PDFs by starting with 4 dimensional space for asset [AC], asset state [P], environment [E], and camera view [CV]. In an embodiment, the process is programmed to construct an empty k-d tree [T]. Check for every Iconic example parameter and example image pair for the example image that is in a state of failure and insert the point of asset [AC], asset state [P], environment, and camera view [CV] into the k-d tree [T]. Then the process is programmed to for every iconic example parameter and example image pair, check for a state of failure for the example image. If the example image is a state of failure, the process is programmed to find a specified number of closest points for asset [AC], asset state [P], environment, and camera view [CV] in the k-d tree [T]. Then for each variable in asset [AC], asset state [P], environment, and camera view [CV], the process is programmed to compute a histogram of failure and covert the histogram to a PDF, then append the PDF to a sequence. The Local Iconic Cluster PDFs can be indexed by a cluster [Z] and contains a PDF for asset [AC], asset state [P], environment, and camera view [CV] for each cluster.

In an embodiment, the process is programmed to compute the Local In Situ Cluster PDFs by starting with a 4 dimensional space for scene [S], camera view [CV], asset [AC], and asset state [P]. The process is programmed to construct an empty k-d tree [T] and to check for every In Situ example parameter and example image pair for the example image that is in a state of failure and insert the point of scene [S], camera view [CV], asset [AC], and asset state [P] into the k-d tree [T]. Then for every iconic example parameter and example image pair, the process is programmed to check for a state of failure for the example image. If the example image is a state of failure, the process is programmed to find a specified number of closest points for scene [S], camera view [CV], asset [AC], and asset state [P] in the k-d tree [T]. Then for each variable in scene [S], camera view [CV], asset [AC], and asset state [P], the process is programmed to compute a histogram of failure and covert the histogram to a PDF. The process is programmed to append the PDF to a sequence. The Local Iconic Cluster PDFs can be indexed by a cluster [Z] and contains a PDF for scene [S], camera view [CV], asset [AC], and asset state [P] for each cluster.

In an embodiment, the process is programmed to compute the Local In Situ Spatial PDFs by starting with a 5 dimensional space for camera orientation coordinates samples [Ctheta, Cphi], and camera view offset translation [CTx, Cty, CTz]. The process is programmed to construct an empty k-d tree [T] and check for every In Situ example parameter and example image pair for the example image that is in a state of failure and insert the point camera orientation coordinates samples [Ctheta, Cphi], and camera view offset translation [CTx, Cty, CTz] in the k-d tree [T]. At this point in the k-d tree [T], the process is programmed to associate the parameters for scene [S], camera orientation coordinates samples [Ctheta, Cphi], and camera view offset translation [CTx, Cty, CTz] with scene [S], camera view [CV], asset [AC], and asset state [P]. Then the process is programmed to define a 5 dimensional space for camera orientation coordinates samples [Ctheta, Cphi], and camera view offset translation [CTx, Cty, CTz]. The process is programmed to construct a new k-d tree [LISSPDFT]. Then the process is programmed to for every iconic example parameter and example image pair, check for a state of failure for the example image. If the example image is a state of failure, the process is programmed to find a specified number of closest points for camera orientation coordinates samples [Ctheta, Cphi], and camera view offset translation [CTx, Cty, CTz] in the k-d tree [T] and find the associated parameters for scene [S], camera view [CV], asset [AC], and asset state [P]. Then the process is programmed to for each variable in scene [S], camera view [CV], asset [AC], and asset state [P], compute a histogram of failure and covert the histogram to a PDF. The PDF is appended to a sequence. The Local In Situ Spatial PDFs can be indexed by the spatial location of camera orientation coordinates samples [Ctheta, Cphi], and camera view offset translation [CTx, Cty, CTz] and contains a PDF for scene [S], camera view [CV], asset [AC], and asset state [P] for each cluster.

The composite value from the score 223 process is used by the Adaptive Synthetic Data Control (ASDC) 224 process. A decision step 225 determines if the process is done and can move the test 226 process or needs more work and proceeds to the tune 216 process.

In one embodiment, described as the "Simple" method, the process is done if the composite value from the score 223 process is a success. In another embodiment of the Adaptative Synthetic Data Control 224 process, described as the "Robust" method, a history of per class and composite failures is collected. The confidence adjusted failure for each class is computed where success means the class does not have a failure in a specified number of previous iterations. Then a composite confidence adjusted success tracks the confidence adjusted success for all members of the class. The training is done when composite confidence adjusted success is a success. Another embodiment uses the same steps as the "Robust" method, but computes the composite confidence adjusted failure on an individual class per example.

In the failure case, the tune 216 process uses a new dataset size for the next iteration using a sequence size control. The sequence size control is a list of sequence sizes to use for the next iteration of the process, with each iteration picking the next size in the list. In one embodiment, a geometric sequence is used with a common ratio such as a factor of 2, for the sequence size control. In another embodiment, a power sequence is used with a common power such as squared, for the sequence size control.

The tune 216 step processes the computation results from the score 223 step and ASDC 224 step for the next iteration. At this step, the process will check for user requests to intervene in the process, such as pause, resume, cancel or will continue if no input is provided. The status information on the state of the process can be reported in tune 216. Criteria such as hyperparameter information and success criteria can be updated and displayed to the user based on the status and results reported. When the process continues, the tune 216 step can start a new integration at different steps. If only the score inputs for minimum intersection over union success criteria has changed, the execution may begin again at the score 223 step. If the hyperparameter information has changed, but no other inputs have changed, the execution may begin again at trial configuration process 215 to resume training. The dataset size or global PDFs have changed, but no other inputs have change, the execution may begin again at the sample 211 to generate more data for training. Otherwise, if additional assets, scenes, environments or cameras are added to the library, the execution must resume at the catalog 210 step to prepare more sources of information for the sample 211 process. In all cases of resume, example images and model state may be shared from previous execution runs.

The test 226 step computes a final accuracy result in the form of an average intersection over union for every example in the synthetic data test 227 and real data test 227 dataset. Each example executes the completed trained model to predict a result and compared with ground truth of the dataset. The intersection of union is calculated for every example in the complete dataset and a final average is computed and reported.

The productionize 228 step makes the trained model ready for use. In one embodiment the model is pruned of the training part to reduce the model size. To optimize the model, all the values and variables are collected into a single file, the graph is frozen through constant folding and collapsing the nodes, and performance can be further improved through quantization of to lower precision values such as 16-bit float or 8-bit integers. In another embodiment the trained model is converted to target execution platform as in mobile devices using the CoreML or TFLite format.

The deliver 229 step makes the trained model accessible for use. In one embodiment the model is deployed in a cloud service that receives and image for inference and results are sent back to the client. In another embodiment, the model can be downloaded for use in an application on device.

This ends 230 the method.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
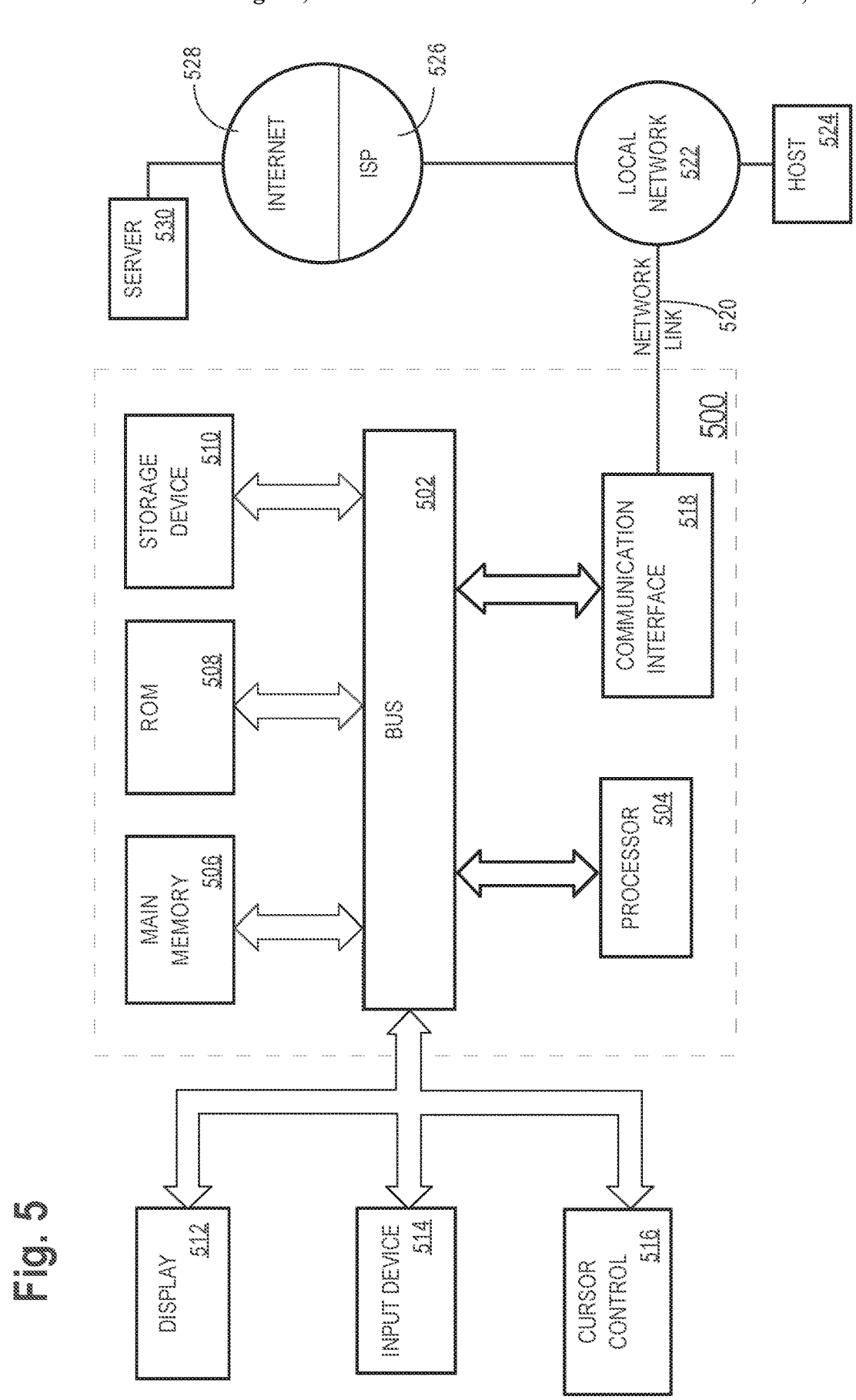
FIG. 5 is a block diagram that illustrates an example computer system with which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or W-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, W-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of a program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

4. Benefits, Extensions and Alternatives

Embodiments provide numerous benefits over prior approaches. Using photography of real-world scenes with human annotation is costly and time-consuming. Synthetic data generation is more configurable and scalable than real-world capture of examples. Due to the generative nature of synthetic data, the process can be adjusted, iterated, and refined in a controlled and repeatable matter. It allows for more precision variations on the dataset to be made while controlling and hold different parameters constant. The process can leverage already generated data and amended with new requirements or annotation to create new datasets. Existing digital assets and associated annotations can be amended and used to generate new dataset in different configurations. Mistakes in user annotations can be isolated and corrected with minimal human time and effort, by correcting the mistake and allowing the system to generate the dataset with the correction. As a user's understanding of their computer vision problem improves, the selection of better parameter configurations involves only restarting an automated process rather than labeling a potentially large amount of new image data.

The state of the art typically is focused on tuning of training parameters for machine learning, but not on the dataset. The generative and adaptive nature of this system and method complements existing hyperparameter tuning methods. The system can be used as a data tuning system to work with and integrated into a training parameter tuning system. The system and methods allow for analysis and testing of the dataset to identify the impact of different parameter dimensions. Individual asset parameters changes for a dataset can be tested for all examples. This approach can be used to identify and quantify the importance of assets, annotations, models, dataset size, training parameters, and other system factors. The use of computer graphics to generate the dataset provide high quality pixel accurate annotation which is difficult to achieve with manual annotations.

In one embodiment, a complete system to deploy a machine vision model is disclosed. This provides an integrated system from capture to inference, collecting the initial assets from real-world data or digital assets. The result is a trained model that can be used for inference in applications.

The capture, configuration, and library component leverages the assets in the creation of dataset examples. In general, there will be thousands to millions of times more dataset examples than assets. This process and method amplifies the effort in capturing and configuring the annotations and asset parameters to by generating large numbers of dataset examples for many conditions. The annotations can be so nuanced and complex that performing a similar annotation via user interface on an entire dataset would be near impossible. An example of this is providing accurate three-dimensional positions or calculations of the maximum distance of objects for every object in an example for an entire dataset.

The sampling approach herein addresses what data to generate. It is inefficient to have to generate a dataset with all possible layouts of all possible assets, in all possible asset configurations, viewed from all possible angles, and under all possible lighting conditions. The system and methods are designed to make use of a sampling as a strategy to efficiently approximate the ideal dataset on specified budget of example images. Sampling as a strategy can be applied to both iconic datasets of similar objects and in situ datasets of complex shape, visibility, and lighting situations.

An Adaptative Synthetic Data Control component automates determining the necessary library and dataset sizes and proportions of variation of parameters for the dataset. There is a penalty in the performance of the trained model for underestimating the dataset size. The common approach to address this issue is to overestimate the dataset size. The Adaptative Synthetic Data Control approach introduces a feedback control such that a valid dataset size can be discovered by the system and method that might be orders of magnitudes smaller than an expert's guess.

The dashboard and API both introduce a way to control, monitor, and interface with the system for an adaptive synthetic data generation in conjunction with a machine learning system. It allows for user intervention to adjust the system for desired results.

What is claimed is:

1. A computer-implemented method of performing machine vision prediction of digital images using synthetically generated training assets, the method implemented using a first set of executable computer program instructions, the method comprising:
digitally capturing a plurality of assets, each of the assets comprising one or more digital data files;
configuring each of the assets in the plurality of assets with a plurality of asset attributes;
under computer program control, selecting a plurality of different combinations of parameters from among the plurality of asset attributes, and creating a plurality of sets of different synthetic dataset parameters;

using computer graphics software that is different than the first set of executable computer program instructions, and example parameter values from among the synthetic dataset parameters, creating a synthetic dataset example image by compiling from a plurality of example images and metadata;

configuring a plurality of machine learning trials and executing the trials to train a machine vision model, resulting in creating and storing a trained machine vision model;

scoring the trained machine vision model to compute performance of the different parameterized assets, resulting in a composite score value for comparison against a set of success criteria and a set of points of failure;

clustering one or more new data points around the points of failure to resample the parametric space using any one of: single choice sampling, sequential choice sampling, local cluster sampling, and local spatial sampling with a probability distribution function;

repeating the configuring the plurality of machine learning trials, executing the trials, scoring the trained machine vision model and the clustering until the composite score value satisfies the success criteria;

executing a validation of the trained machine vision model;

inferring a prediction using the trained machine vision model.

2. The method of claim 1, further comprising:
scoring the trained machine vision model to compute performance of asset and parameter combinations of each trial, resulting in a composite score value for comparison against a set of success criteria;
executing adaptive synthetic data control to determine what other data is needed based upon the composite score value and set of success criteria.

3. The method of claim 1, the sampling further comprising pseudo-randomly drawing uniform samples using any one of: a seeded, scrambled Halton sequence; a seeded, scrambled Sobol; a seeded, Mersenne Twister.

4. The method of claim 1, further comprising creating a plurality of different synthetic datasets created for use in training, validation and testing.

5. The method of claim 1, the synthetic dataset parameters describing examples needed to create a dataset, each example having parameter values to configure digital assets and scenes to render an example image for the dataset.

6. The method of claim 1, the synthetic dataset comprising real-world examples, each parameter value reflecting the real-world examples.

7. The method of claim 1, the synthetic dataset comprising both synthetic and real-world examples, each parameter value reflecting a corresponding example.

8. The method of claim 1, the assets comprising digital images of scenes, environments, maps and cameras.

9. The method of claim 1, the asset attributes comprising any of: a plurality of different pose states and points of interest for cameras to target; in scenes, a plurality of different points of interest locations for asset placements and camera placement; a plurality of different output settings and annotated labels; a plurality of different lighting setups.

10. The method of claim 1, the digital capturing further comprising receiving the assets as two-dimensional digital graphical image files and applying computer-implemented photogrammetry techniques to the two-dimensional digital graphical image files to result in creating and digitally storing a three-dimensional (3D) model of each of the two-dimensional digital graphical image files.

11. The method of claim 10, further comprising using surface material decomposition to replace original textures of each 3D model with high-resolution texture data driven by the original textures.

12. The method of claim 10, further comprising using surface material decomposition to remove one or more attributes of images or scenes to permit transforming each 3D model into a different environment.

13. The method of claim 1, the configuring each of the assets in the plurality of assets with a plurality of asset attributes further comprising:
parameterizing each of the assets by an asset state comprising a first scale, a first plurality of material properties, a first deformation, a first mesh parameterization, and first camera points of interests;
parameterizing each scene by a first list of the assets and a second list of cameras for scene attributes of a second scale, a second plurality of material properties, a second deformation, a second mesh parameterization, and second camera points of interests;
selecting a dataset target from among training, validating and testing, resulting in a selected dataset target;
tagging each scene for the selected dataset target;
configuring an environment map for the selected dataset target;
configuring annotation output states to provide annotations for different outputs;
configuring output images comprising one or more masks selected from among object identifiers and segmentation, depth, color, or custom masks;
configuring output metadata comprising, positions and alignment, labels, hierarchy;
configuring quality settings for output comprising render samples per pixel and resolution;
each of the foregoing comprising minimum and maximum values and collectively comprising a parameter space of the assets.

14. A computer-implemented method of performing machine vision prediction of digital images using synthetically generated training assets, the method implemented using a first set of executable computer program instructions, the method comprising:
digitally capturing a plurality of assets, each of the assets comprising a plurality of digital data files;
parameterizing each of the assets, to create parameterized assets, by an asset state comprising a first scale, a first plurality of material properties, a first deformation, a first mesh parameterization, and first camera points of interests;
parameterizing each scene among the assets by a first list of the assets and a second list of cameras for scene attributes of a second scale, a second plurality of material properties, a second deformation, a second mesh parameterization, and second camera points of interests;
selecting a dataset target from among training, validating and testing, resulting in a selected dataset target;
tagging each scene for the selected dataset target;
configuring an environment map for the selected dataset target;
configuring annotation output states to provide annotations for different outputs;
configuring output images comprising one or more masks selected from among object identifiers and segmentation, depth, color, or custom masks;

configuring output metadata comprising, positions and alignment, labels, hierarchy;

configuring quality settings for output comprising render samples per pixel and resolution;

each of the foregoing comprising minimum and maximum values and collectively comprising a parameter space of the assets;

using a plurality of different parameterized assets from among all the parameterized assets, configuring a plurality of machine learning trials and executing the trials to train a machine vision model, resulting in creating and storing a trained machine vision model;

scoring the trained machine vision model to compute performance of the different parameterized assets, resulting in a composite score value for comparison against a set of success criteria and a set of points of failure;

clustering one or more new data points around the points of failure to resample the parametric space using any one of: single choice sampling, sequential choice sampling, local cluster sampling, and local spatial sampling with a probability distribution function; and repeating the configuring the plurality of machine learning trials, executing the trials, scoring the trained machine vision model and the clustering until the composite score value satisfies the success criteria.

15. The method of claim 12, the sampling further comprising pseudo-randomly drawing uniform samples using any one of: a seeded, scrambled Halton sequence; a seeded, scrambled Sobol; a seeded, Mersenne Twister.

16. One or more non-transitory computer-readable storage media storing instructions programmed for performing machine vision prediction of digital images using synthetically generated training assets and which instructions, when executed using one or more processors, cause the one or more processors to execute:

digitally capturing a plurality of assets, each of the assets comprising one or more digital data files;

configuring each of the assets in the plurality of assets with a plurality of asset attributes;

under computer program control, selecting a plurality of different combinations of parameters from among the plurality of asset attributes, and creating a plurality of sets of different synthetic dataset parameters;

using computer graphics software that is different than the first set of executable computer program instructions, and example parameter values from among the synthetic dataset parameters, creating a synthetic dataset example image by compiling from a plurality of example images and metadata;

configuring a plurality of machine learning trials and executing the trials to train a machine vision model, resulting in creating and storing a trained machine vision model;

scoring the trained machine vision model to compute performance of the different parameterized assets, resulting in a composite score value for comparison against a set of success criteria and a set of points of failure;

clustering one or more new data points around the points of failure to resample the parametric space using any one of: single choice sampling, sequential choice sampling, local cluster sampling, and local spatial sampling with a probability distribution function;

repeating the configuring the plurality of machine learning trials, executing the trials, scoring the trained machine vision model and the clustering until the composite score value satisfies the success criteria;

executing a validation of the trained machine vision model;

inferring a prediction using the trained machine vision model.

17. The computer-readable storage media of claim 16, further comprising instructions which when executed using the one or more processors cause the one or more processors to execute:

scoring the trained machine vision model to compute performance of asset and parameter combinations of each trial, resulting in a composite score value for comparison against a set of success criteria;

executing adaptive synthetic data control to determine what other data is needed based upon the composite score value and set of success criteria.

18. The computer-readable storage media of claim 16, further comprising further comprising instructions which when executed using the one or more processors cause the one or more processors to execute the sampling by pseudo-randomly drawing uniform samples using any one of: a seeded, scrambled Halton sequence; a seeded, scrambled Sobol; a seeded, Mersenne Twister.

* * * * *